United States Patent
Hasshi

[11] Patent Number: 6,089,582
[45] Date of Patent: *Jul. 18, 2000

[54] STRUT WHEEL SUSPENSION SYSTEM

[75] Inventor: Suehiro Hasshi, Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/042,800

[22] Filed: Mar. 17, 1998

[30] Foreign Application Priority Data

Mar. 21, 1997 [JP] Japan .................................. 9-068236

[51] Int. Cl.⁷ ................................................ B62D 7/18
[52] U.S. Cl. ............................ 280/93.512; 280/124.146; 280/124.154
[58] Field of Search ...................... 280/93.51, 93.512, 280/124.145, 124.146, 124.154, 135.15, 124.142, 124.134, 124.1, 86.751, FOR 118, FOR 124, FOR 126, 124.152

[56] References Cited

U.S. PATENT DOCUMENTS

| | | |
|---|---|---|
| 4,274,654 | 6/1981 | Travaglio ................................ 280/668 |
| 4,458,915 | 7/1984 | Emery ..................................... 280/668 |
| 4,944,524 | 7/1990 | Achenbach ............................. 280/701 |
| 4,995,633 | 2/1991 | Santo ...................................... 280/673 |
| 5,499,839 | 3/1996 | Wahl et al. ............................. 280/701 |
| 5,797,618 | 8/1998 | Brokholc ................................ 280/689 |

*Primary Examiner*—Paul N. Dickson
*Attorney, Agent, or Firm*—Armstrong, Westerman, Hattori, McLeland & Naughton

[57] ABSTRACT

In a strut type wheel suspension system comprising a knuckle arm extending vertically from a knuckle, an intermediate part of a knuckle end of a linear damper is attached to a part of the knuckle arm so as to reinforce each other. Thereby, the knuckle arm may be made compact without compromising the camber rigidity or the precision and stability of wheel alignment. Also, the linear damper is not require to be modified from a conventional design.

5 Claims, 2 Drawing Sheets

STRUT WHEEL SUSPENSION SYSTEM

BACKGROUND OF THE INVENTION

1. Field of the Invention

The present invention relates to a wheel suspension system for a steerable wheel, and in particular to a wheel suspension system comprising a knuckle arm extending upward from a knuckle.

2. Description of the Related Art

Strut type and double wishbone type wheel suspension systems are most commonly used in automobiles as the front wheel suspension systems. Strut type wheel suspension systems are simple in structure, and are therefore relatively inexpensive. The knuckle carrying a wheel is substantially rigidly attached to an outer tube or the lower end of a tubular damper. When the wheel is required to be steered, a steering gear is connected to a knuckle arm extending from the knuckle. In some cases, the steering gear is disposed above the axle of the wheel. In such a case, if the line of force transmission from the tie rod to the knuckle arm forms a large angle with respect to the direction of the motion of the knuckle arm, the force from the steering gear cannot be efficiently transmitted to the knuckle arm. Therefore, it is desirable, in such a case, to form an upwardly extending knuckle arm so that a tie rod may extend substantially horizontally between the steering gear and the knuckle arm.

However, simply extending the knuckle arm upward may lead to the need to reinforce the knuckle arm so as to have sufficient rigidity and mechanical strength, and this may undesirably increase the size and weight of the knuckle. In a strut type wheel suspension system, because the outer tube of the damper is substantially rigidly attached to the knuckle, it is conceivable to attach the knuckle arm to an intermediate part of the outer tube of the damper. However, this requires the outer tube of the damper to be sufficiently rigid and strong so as to withstand twisting and other forces that may be applied to the damper. This will require the damper to be specially designed, and is detrimental to compact and economical design of the wheel suspension system.

SUMMARY OF THE INVENTION

In view of such problems of the prior art, a primary object of the present invention is to provide a wheel suspension system which is suited to be used in combination with a steering gear disposed above the axle of the wheel.

A second object of the present invention is to provide a wheel suspension system for a steerable wheel which is simple in structure, and compact in design.

According to the present invention, these and other objects can be accomplished by providing a wheel suspension system, for supporting a knuckle rotatably carrying a steerable wheel with respect to a vehicle body, comprising: a linear damper having a lower end substantially rigidly attached to a part of the knuckle and an upper end supported by a part of the vehicle body; a spring resiliently supporting the knuckle with respect to the vehicle body; a lower arm having an outer end pivotally connected to a lower part of the knuckle and an inner end pivotally attached to a part of the vehicle body; a knuckle arm extending upward from the knuckle; and a fastening member for securing a part of the knuckle arm to an intermediate part of a knuckle end of the linear damper.

Thus, the knuckle arm and the lower part of the linear damper are joined together by the fastening member such as a clamp member placed around the linear damper so that the two parts reinforce each other. As a result, the knuckle arm may be made compact without compromising the camber rigidity or the precision and stability of wheel alignment. Also, the linear damper is not required to be modified from a conventional design. This allows a efficient transmission of a force from a steering gear placed above the axle of the wheel via a tie rod which extends substantially horizontally above the wheel axle.

The fastening member may be conveniently used for attaching an end a stabilizer via a link arm so that the stabilizer may perform its function without being interfered with by any changes in the camber angle of the wheel.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
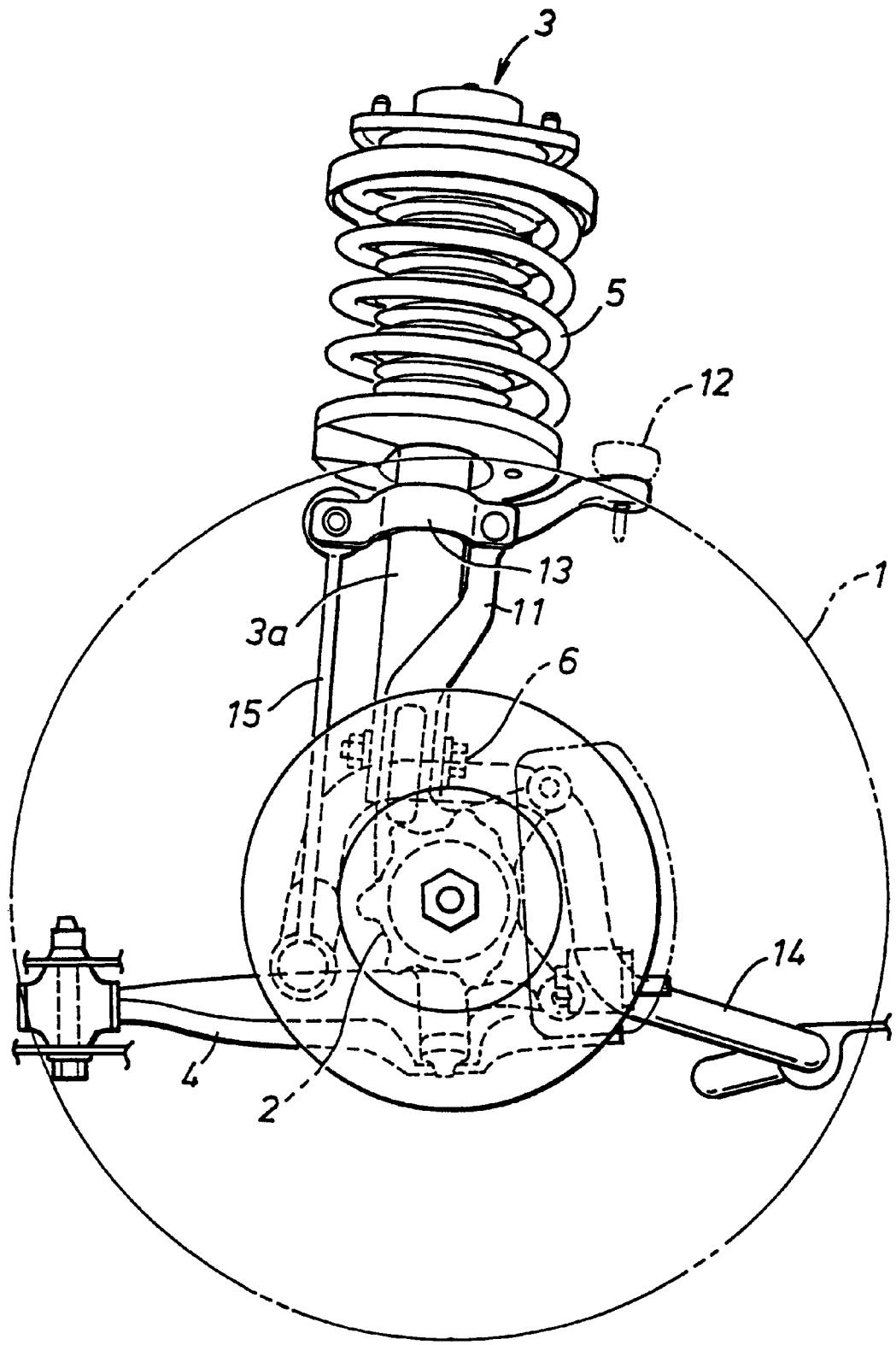
FIG. 1 is a fragmentary side view showing a strut type wheel suspension system embodying the present invention.
Figure 2:
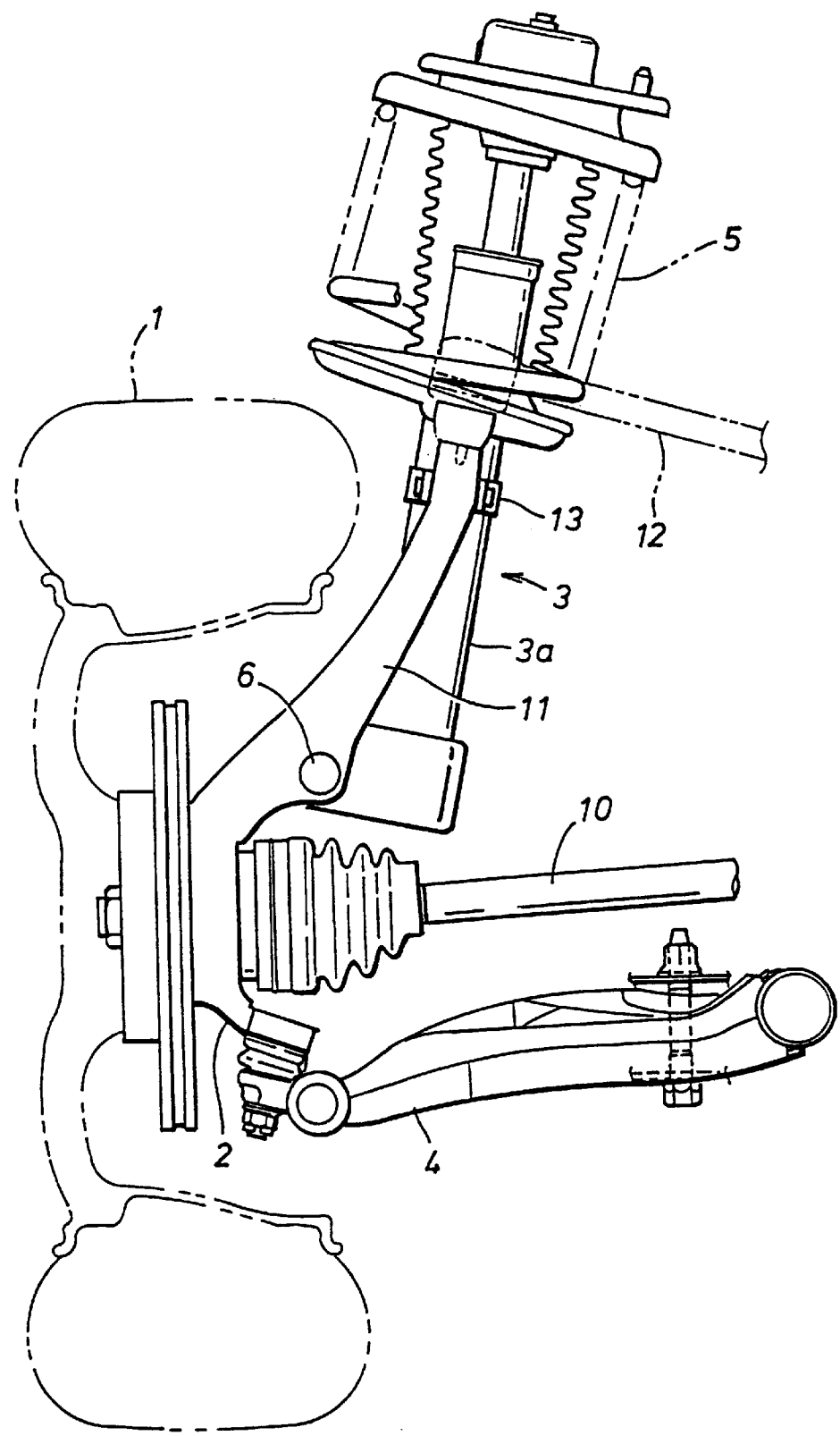
FIG. 2 is a fragmentary front view of the wheel suspension system of FIG. 1.

FIGS. 1 and 2 show a strut type wheel suspension system embodying the present invention which is suited to be combined with a rack and pinion steering gear (not shown in the drawings). The wheel suspension system comprises a knuckle 2 rotatably supporting a wheel 1, a linear damper 3 connected between an upper part of the knuckle 2 and a part of the vehicle body such as a front fender, and a lower arm 4 connected between a lower part of the knuckle 2 and another part of the vehicle body such as a side frame. The linear damper 3 extends substantially vertically while the lower arm 4 extends substantially io horizontally. A coil spring 5 which coaxially surrounds the linear damper 3 is interposed between an intermediate portion of the outer tube (the knuckle-end) of the linear damper 3 and a fixed part of the vehicle body.

The lower end of the damper 3 is connected to the upper part of the knuckle 2 via a pivot shaft 6 extending in the fore-and-aft direction of the vehicle. The lower part of the knuckle 2 is connected to an outer end of the lower arm 4 via a ball joint. The wheel 1 is adapted to be rotated by a drive shaft 10 which extends laterally with respect to the vehicle body from a transmission not shown in the drawings. A tie rod 12 is connected to a free end of a knuckle arm 11 which extends substantially vertically upward from an upper part of the knuckle 2. The tie rod 12 extends substantially horizontally above the drive shaft of the wheel, and is connected to a steering gear which is also placed above the drive shaft of the wheel although it is not shown in the drawings.

A part of the knuckle arm 11 adjacent to a point of pivotal connection with the tie rod 12 is secured to the outer tube 3a of the linear damper 3 via a holder 13 which in this case consists of a clamp member clamped around the outer tube 3a. Thus, the damper 3 is attached to the knuckle 2 at two parts which are vertically displaced from each other so that the camber rigidity of the wheel can be increased. This contributes to an increase in the stability and precision of wheel alignment. This also reinforces the knuckle arm 11.

Additionally, an end of a stabilizer 14 is connected to a part of the holder 13 diagonally opposite from the point of pivotal connection to the tie rod 12 via a vertically extending link arm 15. This ensures a stable operation of the stabilizer 14 without being affected by any changes in the camber angle of the wheel.

Thus, according to the present invention, the knuckle arm and the linear damper reinforce one another so that the knuckle arm may be made compact without compromising the camber rigidity or the precision and stability of wheel alignment. Also, the linear damper is not required to be modified from a conventional design. When an end of a stabilizer is connected to an intermediate part of the linear damper via a link arm, it is possible to stabilize the operation of the stabilizer as well.

Although the present invention has been described in terms of a preferred embodiment thereof, it is obvious to a person skilled in the art that various alterations and modifications are possible without departing from the scope of the present invention which is set forth in the appended claims.

What we claim is:

1. A wheel suspension system including a knuckle rotatably carrying a steerable wheel with respect to a vehicle body, comprising:

a linear damper having a lower end substantially rigidly attached to a part of the knuckle and an upper end supported by a part of the vehicle body;

a spring resiliently supporting the knuckle with respect to the vehicle body;

a lower arm having an outer end pivotally connected to a lower part of the knuckle and an inner end pivotally attached to a part of the vehicle body;

a knuckle arm extending upward from said knuckle and connected to a tie rod of a steering system mounted in the vehicle body; and a fastening member for securing a part of said knuckle arm to an intermediate part of said linear damper.

2. A wheel suspension system according to claim 1, wherein said fastening member comprises a clamp member clamped around said knuckle end of said linear damper.

3. A wheel suspension system according to claim 1, wherein an end of said knuckle arm is pivotally connected to the tie rod which extends substantially horizontally above a drive shaft connected to said wheel.

4. A wheel suspension system according to claim 1, wherein an end of a stabilizer is additionally attached to said fastening member via a link arm.

5. A wheel suspension system according to claim 1, wherein said spring consists of a coil spring coaxially surrounding said linear damper, and having a lower end supported by a knuckle-end of said damper, and an upper end supported by a part of the vehicle body.

* * * * *